Oct. 2, 1928.

F. JACKSON 1,686,156

GRAIN SHOCKER

Filed Sept. 11, 1924    6 Sheets-Sheet 1

Inventor
FRED JACKSON,
By
Attorney

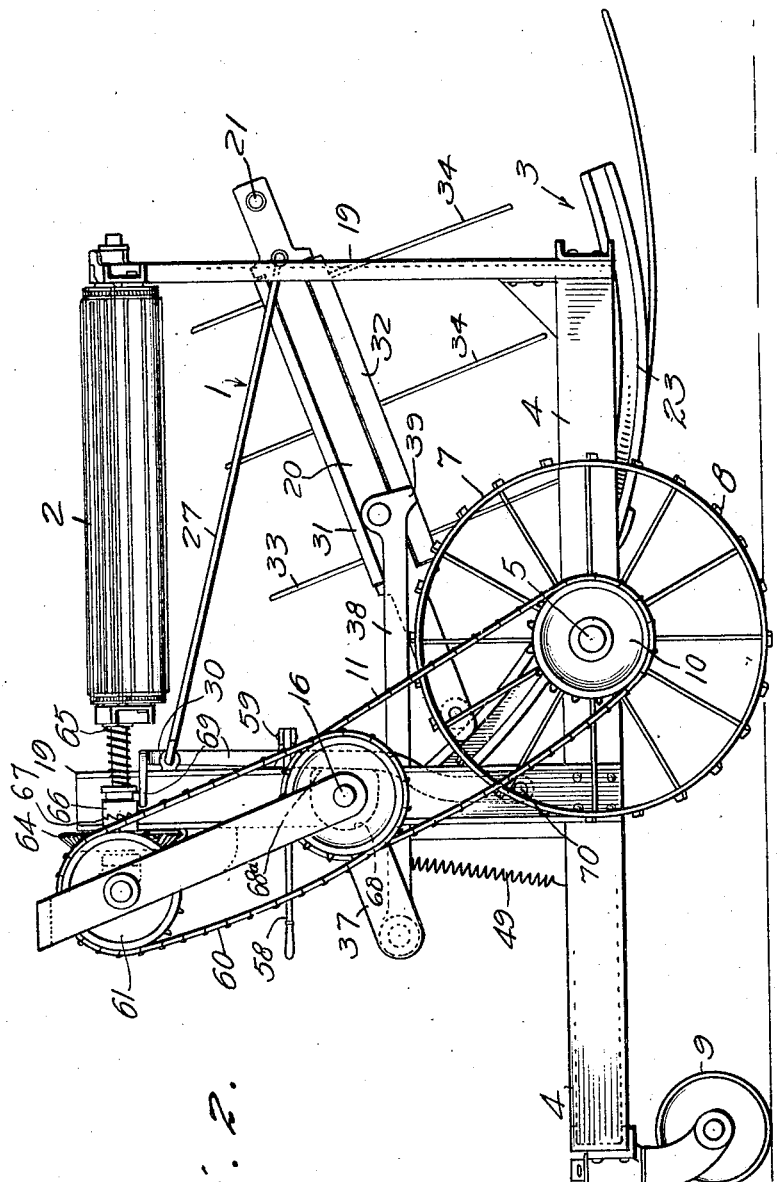

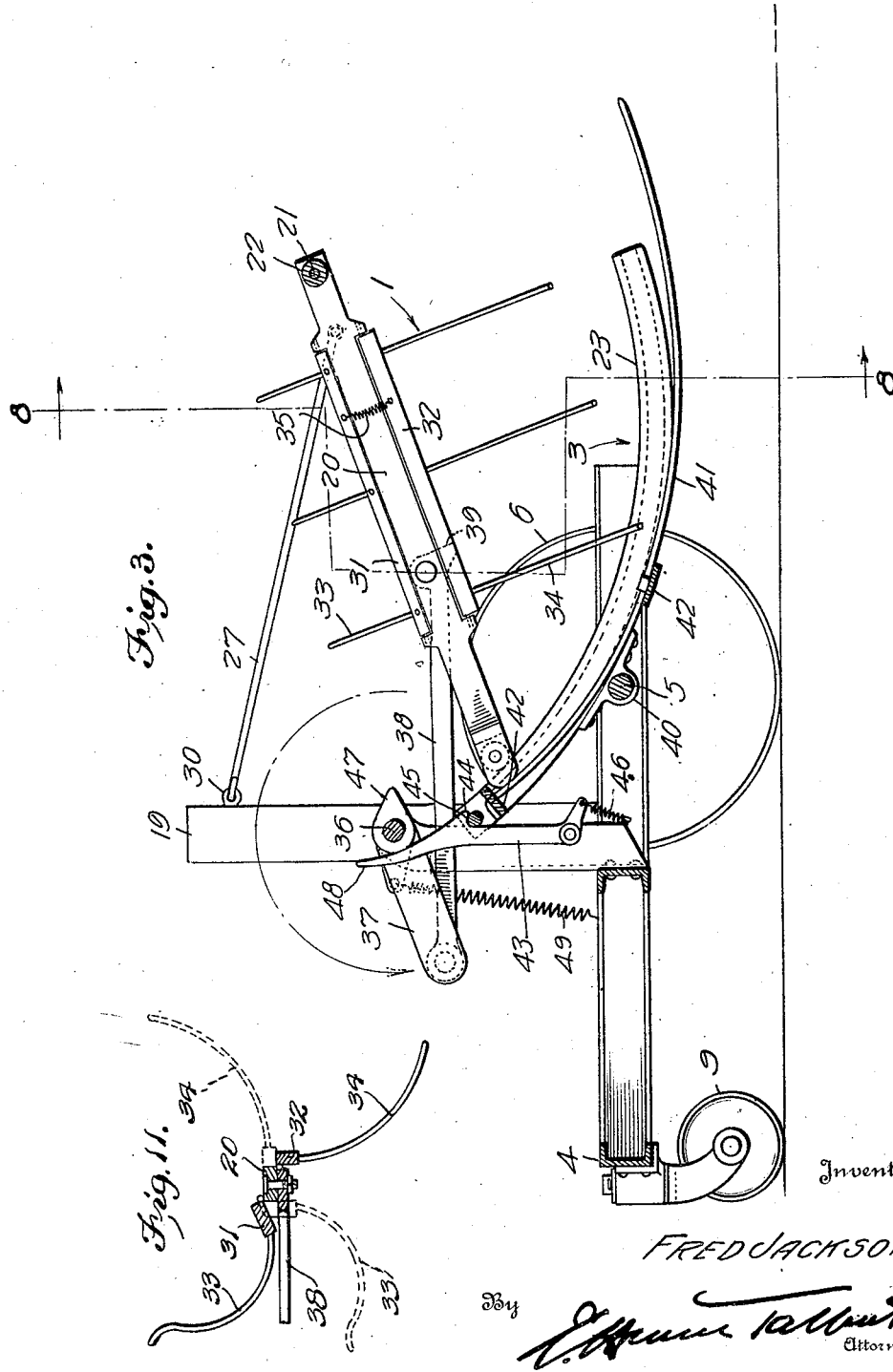

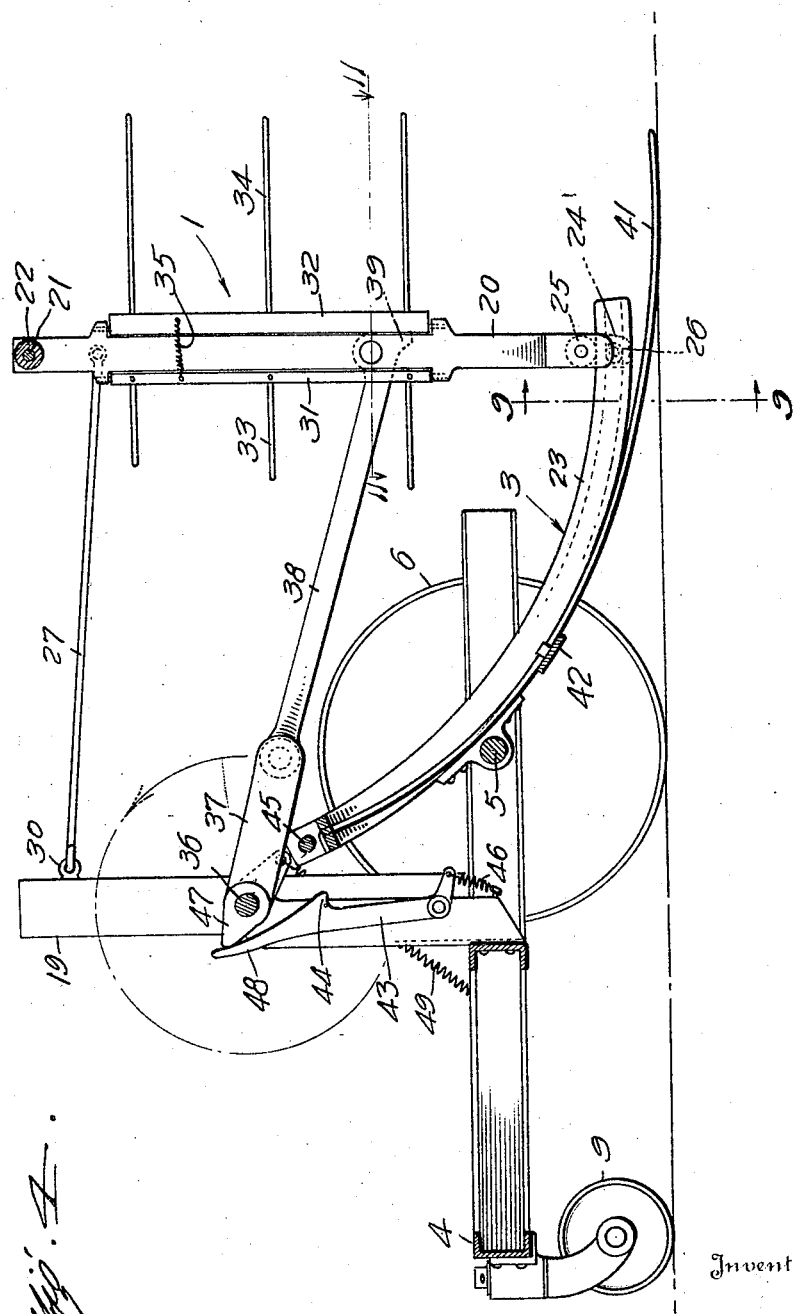

Oct. 2, 1928.
F. JACKSON
1,686,156
GRAIN SHOCKER
Filed Sept. 11, 1924    6 Sheets-Sheet 5
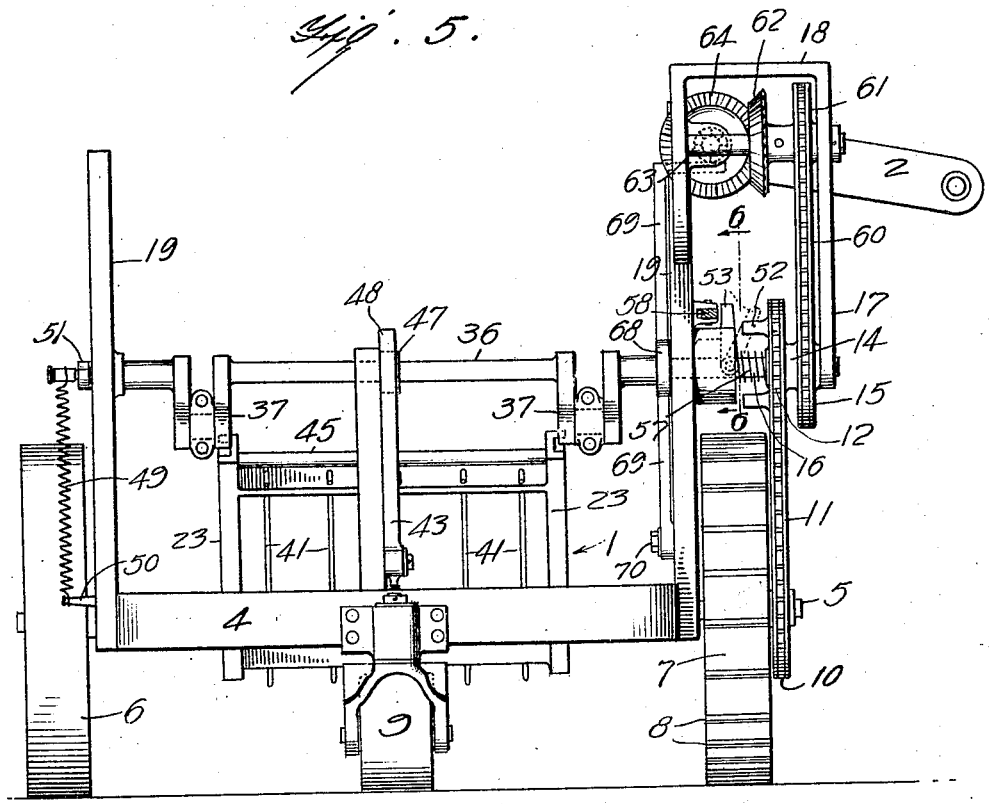
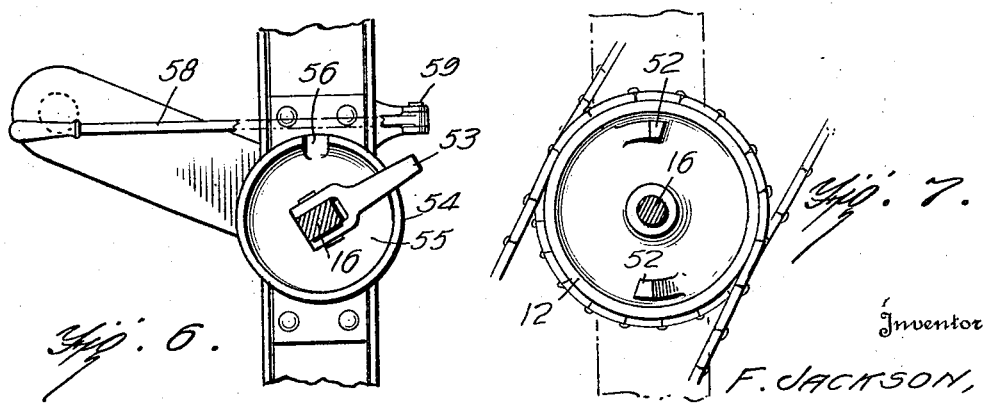
Inventor
F. JACKSON,
By E. Hmm Talbert
Attorney

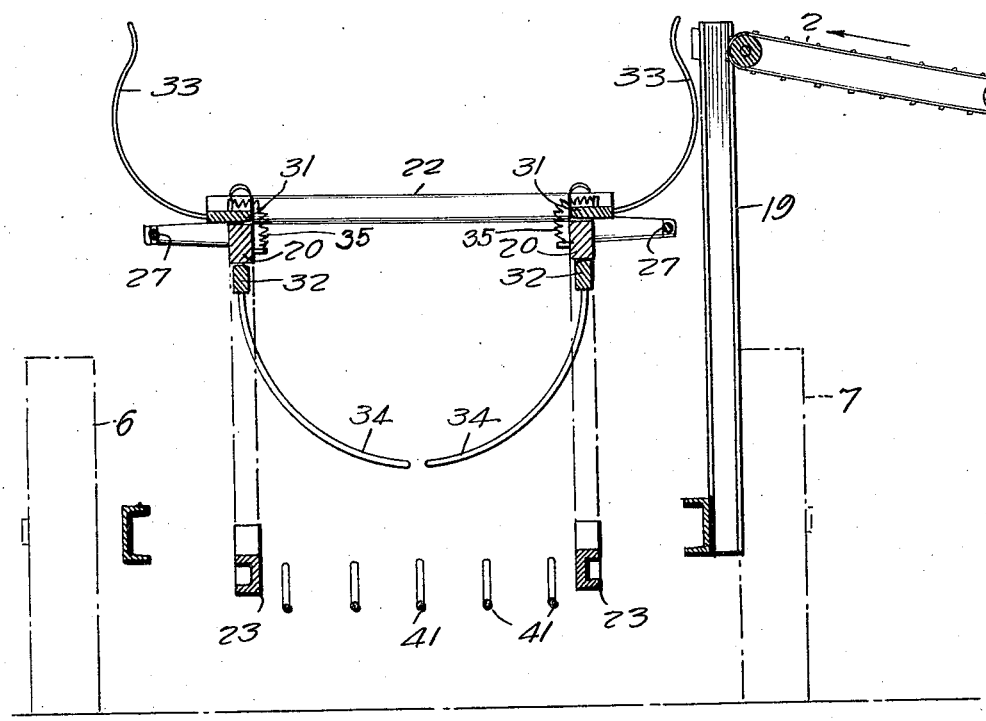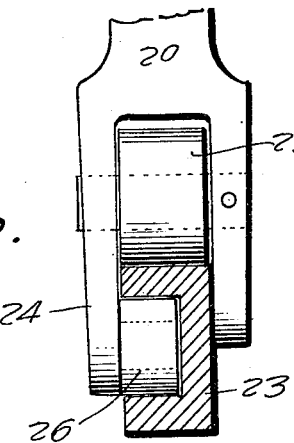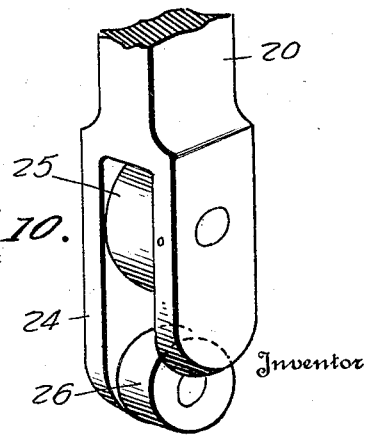

Patented Oct. 2, 1928.

1,686,156

UNITED STATES PATENT OFFICE.

FRED JACKSON, OF CLAY CITY, INDIANA.

GRAIN SHOCKER.

Application filed September 11, 1924. Serial No. 737,143.

The purpose of the invention is to provide an apparatus of the kind indicated wherein the stalks may be transferred to the device in a horizontal position and the shock thus formed to be thereafter transferred to a standing or vertical position and deposited upon the ground; to provide for the actuation of the shock former by means under control of the operator, so that at the desired time and place the shock may be deposited; and to provide a mechanism wherein all the parts automatically operate in synchronism, in order that the attention of the operator may be only necessary to select the point of deposit.

With this purpose in view, the invention consists in the construction and combination of parts of which a preferred embodiment is illustrated in the accompanying drawings, wherein:

Figure 2 is a side elevational view.

Figure 3 is a central longitudinal vertical sectional view of the apparatus.

Figure 4 is a view similar to Figure 3 but showing the parts in discharging position.

Figure 5 is a front elevational view.

Figure 6 is a detail sectional view on the plane indicated by the line 6—6 of Figure 5.

Figure 7 is a detail elevational view of the element by means of which motion from the driving means is communicated to the shock former actuating means.

Figure 8 is a sectional view on the plane indicated by the line 8—8 of Figure 3.

Figure 9 is a detail sectional view on the plane indicated by the line 9—9 of Figure 4.

Figure 10 is a detail perspective view illustrating the guide rollers and attendant fork by which connection is effected between the shock former and the shock table.

Figure 11 is a sectional view on line 11—11 of Figure 4.

Figure 1:
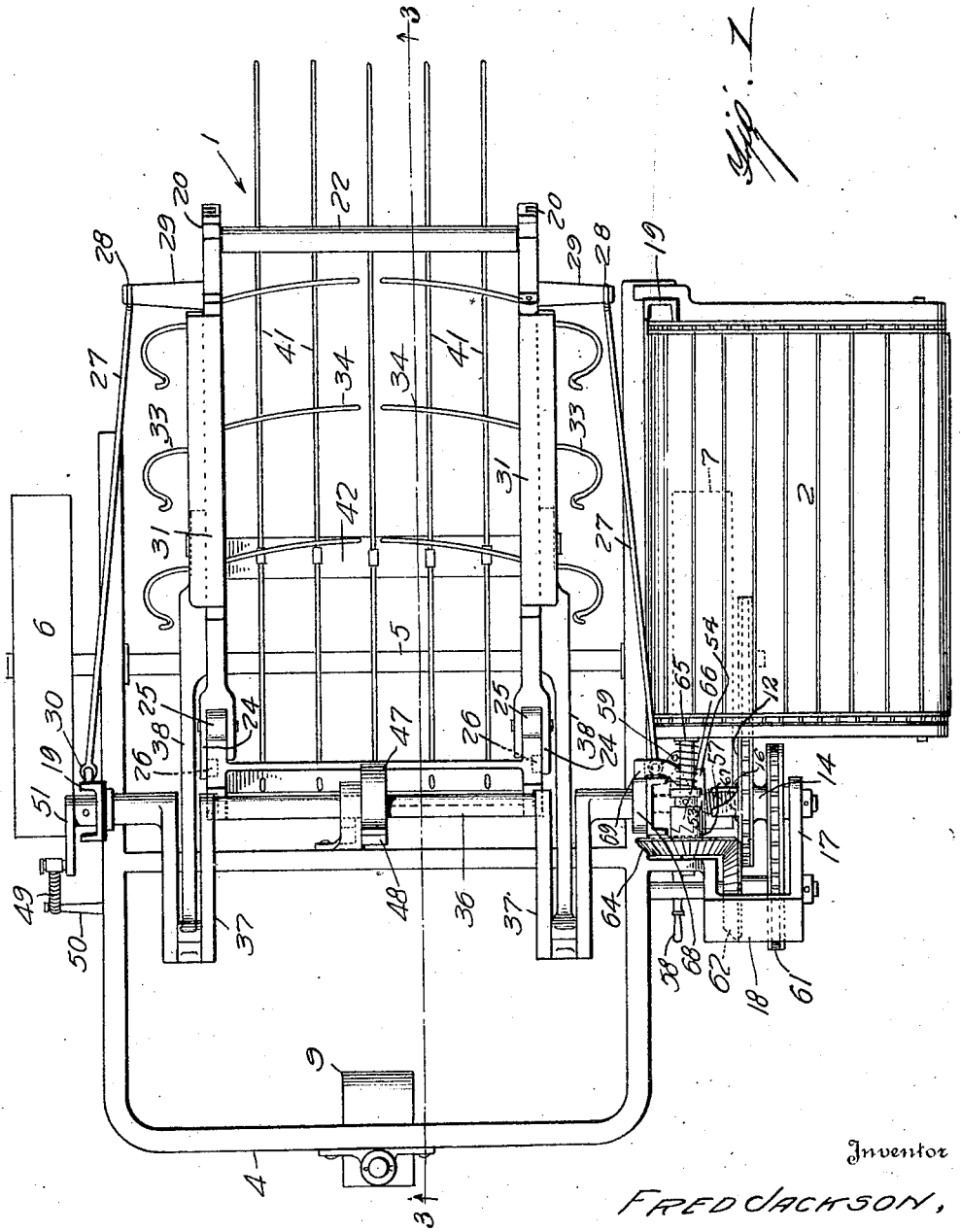
Figure 1 is a top plan view of an apparatus embodying the invention.

The bundles of grain are transferred to the shock former 1 by means of a conveyor 2, the receiving position of the shock former being horizontal and it being adapted for movement to a vertical position over an oscillatory table 3. The conveyor, table and shock former are carried by the frame 4 made preferably of standard steel sections and supported on the axle 5 carried by the ground wheels 6 and 7 of which the latter is provided with peripheral lugs 8. At the forward end, the frame is supported on a caster wheel 9. The traction wheel 7 constitutes the operating means for the various parts of the apparatus and to this end carries a sprocket wheel 10 over which is trained a chain 11 traversing a sprocket 12, the latter being formed integrally with a hub 14 connected with which as an integral part is a sprocket 15. The sprockets 12 and 15 are mounted for rotation on a stub shaft 16 carried by a depending arm 17 of a looped portion 18 of the frame, the looped portion 18 being carried by an upright standard 19.

The shock former 2 consists of the side bars 20 connected at their outer ends by a tie rod 21 surrounded by a roller 22. The inner ends of the bars 20 traverse the arcuate side rails 23 of the table 3. These side rails are preferably channel-shaped and the inner ends of the side bars are preferably forked, as at 24, for disposition in straddling relation with the side rails, carrying rollers 25 traversing the upper surfaces of the side bars and supplemental rollers 26 traversing the channels. In movement from the normal horizontal receiving position to the vertical discharging position, the inner ends of the side bars 20 traverse the side rails of the table and to provide for the consequent slight oscillating movement of the upper ends of the side bars, the latter are connected with the standards 19 by means of tie rods 27 pivotally engaged, as at 28, with lateral posts 29 on the side bars and connected with the standards 19 by a universal connection, such as the connecting eyes 30.

The shock former is provided with oppositely disposed gates consisting of pivotally mounted bars 31 and 32 disposed in recesses in the side bars 20 and provided with fingers 33 and 34. The bars 31 and fingers 33 constitute the upper and forward gates, depending on the position of the shock former, while the bars 32 and fingers 34 constitute the bottom and rear gates, depending on the position of the shock former, and inasmuch as each bar 20 carries a pair of gates, the forward or upper and the bottom or rear gates are alternately disposed in spanning relation with the table 3. The gates are all yieldingly impelled toward open positions by springs 35 transversely spanning the bars 20 and having terminal connections with lateral pins on the bars 31 and 32.

The actuating means for the shock former which is shifted from the horizontal to the vertical position and vice versa consists of a crank shaft 36 journaled in the standards 19 and having cranks 37 connected with the side bars 20 by connecting rods 38. In the normal horizontal position of the shock former, the side bars 20 are horizontal and in such position the cranks 37 and connecting rods 38 are also horizontal. In such a position, the springs 35 are free to move the upper or forward gates to open position but the bottom or rear gates are retained in closed position because of the extensions 39 on the connecting rods overlapping the bars 32. Thus, the bundles of grain transferred from the conveyor 1 may be deposited in the shock former, the fingers 34 constituting the bottom of the shock former in the horizontal position and supporting the stalks as they are deposited therein. When enough bundles have been deposited to constitute a shock, it is the purpose to bind them together with twine, but inasmuch as a conventional form of tying and knotting mechanism is to be employed and contitutes no part of the present invention, no such construction is disclosed, being unnecessary to an understanding of the invention.

After the shock has been tied, the shock former is actuated by the crank shaft 36 being put in motion. The lower ends of the rails 20 then traverse the side bars or rails 23 of the shock table and the shock former moves from a horizontal to a vertical position, during which operation the connecting rods assume angular positions with reference to the side bars 20 and in so doing engage the bars 31, rocking them on their pivots and moving the forward or upper gates to closed position. When the shock former has reached a vertical position, however, the projections 39 will have passed out of obstructing relation with the side bars 20 (as clearly shown in Figure 4) and the springs 35 will be free to move the bottom or rear gates to open position so that the shock may be discharged.

During this period of movement of the shock former, the table 3 is designed to be held stationary, it being mounted for oscillating movement on the axle 5 to which it is connected by means of straps 40 secured to the under surface of the side rails 23 and the bottom of the table consists of fingers 41 supported by transverse bars 42 spanning the side rails. When the shock former reaches its vertical position, the construction provides for the release of the table so that the rear end may drop to permit the terminals of the fingers 41 to rest upon the ground, so that as the rear gates open the shock may be readily deposited.

The means for locking the table to prevent oscillatory movement consists of a latch member 43 having a nose 44 engaging a bar 45 spanning the side rails 23 and a spring 46 functions to impel the latch member toward the bar for the engagement of the nose 44 therewith. The latch member is designed for actuation by a cam 47 carried on the crank shaft and this cam engages an extension 48 on the latch member and in the vertical position of the shock former. The rise of the cam engages the extension and thus deflects the latch member so as to disengage the nose 44 from the bar 45, thus permitting the rear end of the table to drop and the shock former having an interlocking engagement with the shock table through the instrumentality of the rollers 25 and 26 also lowers with the table, the pivotal connections of the connecting rods 38 and the tie rods 27 permitting this.

The crank shaft moves in the direction indicated in Figures 3 and 4 of the drawings and the movement of the crank shaft is uniform until the shock former reaches its vertical or discharging position. After the shock has been discharged, the shock former is returned quickly to its receiving horizontal position, and to this end a quick return for the crank shaft is provided in the form of a spring 49 tensioned between a lateral post 50 on the frame 4 and a crank arm 51 on one extremity of the crank shaft. The connection between the driving means and the crank shaft is such as to permit this, as hereinafter appears. After the crank shaft has begun its second half of the revolution which returns the shock former to horizontal position, the spring 49 begins to function and the quick return is accomplished, the bars 20, after the inner ends have passed the axle 5, serving to depress the rear end of the table until finally the nose 44 is engaged with the bar or rod 45 and the table is latched in position.

The sprocket 12 constitutes the driving means for the crank shaft 36 for the first half of its revolution when the shock former is shifted to vertical position. It is axially aligned with the crank shaft since the stub shaft 16 is an extension of the latter, and the operative connection between the sprocket and the crank shaft constitutes diametrically opposite lugs 52 laterally projecting from the sprocket and engageable with a pivotal arm 53 carried by the crank shaft and traversing the edge of the peripheral flange 54 of a disk or head 55 mounted on the outer face of the standard 19 with which the looped bracket 18 is carried. As the arm 53 is engaged with the flange 54, it is disposed in obstructing relation with the lugs 52 and the sprocket rotating, motion is perforce communicated to the crank shaft. So long as the spring 49 remains inert, as when the shock former is traversing to vertical position, the arm 53 remains in engagement with one of the lugs 52 but immediately the spring begins to function, the crank shaft is carried quickly in the direction in which it was previously moving and the arm 53 is thereby carried away from the lug and continues its travel around the flange of the head 55 until it reaches a position opposite the notch 56, into which it is forced by a compression spring 57 carried on the stub shaft 16. The stub shaft 16 may be made an integral part of the crank shaft 36, or may be separate therefrom, or separate and coupled thereto, as practice may dictate. So long as the arm 53 remains in engagement with the notch 56, the crank shaft 36 remains inactive and the shock former rests in its normal horizontal receiving position.

When it is desired that the shock former shall shift to its discharging position, the operator shifts the lever 58 which is pivotally mounted, as at 59, on one of the standards 19 adjacent the head 55 and this lever being disposed in obstructing relation with the extremity of the arm 53 projecting radially beyond the head, the arm 53 is shifted out of the notch 56 against the pressure of the spring 57 and disposed for engagement with one of the lugs 52 when motion will be communicated to the crank shaft and actuation of the shock former and table effected as before described. Motion is obviously communicated to the gear 12 by the ground wheel 7 through the chain 11. The ground wheel 7 also constitutes means for actuating the conveyor 1 and to this end a chain 60 serves to communicate the motion of the sprocket 15 received by the sprocket 12 to the sprocket 61 which drives a bevel gear 62 carried on a shaft 63 mounted in the looped bracket 18. The bevel gear 62 is in mesh with a bevel gear 64 loosely mounted on the drive shaft 65 of the conveyor and is operatively connected therewith through a clutch of which the spring actuated element 66 is yieldingly impelled toward the gear-carried element 67. When the shock former is being actuated to discharge its load, it is essential that the conveyor be stopped and to this end a cam member 68 is mounted on the crank shaft 36 and engages a shifter lever 69 pivoted on the upright 19 as at 70. When the shock former is in its receiving position, the crank shaft is at rest and the flat edge 68ª on the cam member 68 is positioned opposite the shifter lever, thus permitting the spring to force the clutch member 66 into engagement with the clutch member 67. When the shock former is actuated by motion communicated to the crank shaft 36, the cam 68 is also actuated and oscillatory movement communicated to the shifter lever, thus separating the clutch members 66 and 67 and leaving the conveyor inoperative.

The invention having been described, what is claimed as new and useful is:

1. In a grain shocker, a shock former, means for supporting the same for movement from a normal horizontal receiving position to a vertical discharging position, actuating means for moving the shock former from the one to the other of said positions, the shock former being provided with oppositely opening gates, and means for retaining one of the gates closed in one of the positions and the other of the gates closed in the other of the positions, the gates being yieldingly impelled to open position and alternately locked in closed position by an element of the actuating means.

2. In a grain shocker, a shock former mounted for movement from a horizontal to a vertical position, actuating means for the shock former, and oppositely disposed gates with yieldable means for impelling the gates to open positions, and an element constituting a part of the actuating means for alternately locking the gates in closed positions.

3. A grain shocker having a shock former mounted for movement from a horizontal receiving to a vertical discharging position, actuating means for the shock former, and an oscillatory table below the shock former and having a sliding interlocking connection with one end of the latter.

4. A grain shocker having a shock former mounted for movement from a horizontal receiving to a vertical discharging position, actuating means for the shock former, an oscillatory table disposed below the shock former and having a sliding interlocking connection with one end of the latter, a latch retaining the table in stationary position, and tripping means for operating the latch and thereby releasing the table in one of the extreme positions of the shock former.

5. A grain shocker having a shock former provided with swinging lateral supporting means, an oscillatory shock table disposed below the shock former and having a sliding interlocking connection with one end of the latter, means for actuating the shock former to shift it from horizontal to vertical position and vice versa, a conveyor actuable to discharge bundles into the shock former when the latter is in horizontal position, and actuating means for the conveyor.

6. A grain shocker having a shock former provided with swinging lateral supporting means, an oscillatory shock table disposed below the shock former and having a sliding interlocking connection with one end of the latter, means for actuating the shock former to shift it from horizontal to vertical position and vice versa, a conveyor actuable to discharge bundles into the shock former when the latter is in horizontal position, actuating means for the conveyor, and automatic means for effecting operation of the conveyor actuating means only at the time of the horizontal position of the shock former.

7. A grain shocker having a shock former provided with lateral swinging supporting means, an oscillatory shock table disposed below the shock former and having a sliding interlocking connection with one end of the latter, means for actuating the shock former to shift it from horizontal to vertical position and vice versa, a conveyor for conveying bundles to the shock former when the latter is in horizontal position, actuating means for the conveyor, an individual manual control for the shock former actuating means, and an automatic control for rendering the conveyor actuating means inactive during the operation of the shock former actuating means.

8. In a grain shocker, a shock former provided with lateral swinging supporting means, an oscillatory shock table disposed below the shock former and having a sliding interlocking connection with one end of the latter, means for actuating the shock former to shift it from normal horizontal receiving position to vertical discharging position, a latch for the table to retain it normally in stationary position, and latch releasing means carried by the shock former actuating means.

9. In a grain shocker, a shock former provided with lateral swinging supporting means, an oscillatory shock table disposed below the shock former and having a sliding interlocking connection with one end of the latter, means for actuating the shock former to shift it from normal horizontal receiving position to vertical discharging position, a latch for the table to retain it normally in stationary position, and latch releasing means carried by the shock former actuating means, the latch releasing means being operable just prior to the shock former actuating means disposing the shock former in vertical position.

10. In a grain shocker, a shock former provided with lateral swinging supporting means, an oscillatory shock table disposed below the shock former and having a sliding interlocking connection with one end of the latter, means for actuating the shock former to shift it from normal horizontal receiving position to vertical discharging position, a latch for the table to retain it normally in stationary position, and latch releasing means carried by the shock former actuating means, the latch releasing means being operable just prior to the shock former actuating means disposing the shock former in vertical position, the shock former being provided with opposed pairs of gates yieldingly impelled to open positions and an element of the actuating means of the shock former alternately locking said gates in closed positions during the movements of the shock former.

11. In a grain shocker, the combination with a frame having an axle and supporting wheels, of a tilting table mounted upon the axle, a shock former mounted for reciprocating and arcuate movement upon the table, said shock former having operative connections with the sides of the table and provided opposed pairs of gates, means tending to move the gates to open position, and means for alternately closing the separate pairs of gates.

12. In a grain shocker, a shock former, a shock table disposed below the shock former and supporting the latter at the lower end, means for actuating the shock former to shift it from horizontal to vertical position and vice versa, a conveyor for conveying the bundles to the shock former when the latter is in horizontal position, actuating means for the conveyor, and automatic means for rendering the conveyor actuating means inactive.

In testimony whereof he affixes his signature.

FRED JACKSON.